United States Patent
Liu et al.

(10) Patent No.: US 11,801,765 B2
(45) Date of Patent: Oct. 31, 2023

(54) CHARGING PILE AND CHARGING PILE CONTROL METHOD

(71) Applicant: Huawei Digital Power Technologies Co., Ltd., Shenzhen (CN)

(72) Inventors: Gesheng Liu, Shenzhen (CN); Jianghui Yang, Dongguan (CN); Feng Liu, Dongguan (CN); Ping Kuang, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/382,168

(22) Filed: Jul. 21, 2021

(65) Prior Publication Data

US 2021/0347272 A1 Nov. 11, 2021

Related U.S. Application Data

(63) Continuation of application No. PCT/CN2020/076276, filed on Feb. 21, 2020.

(51) Int. Cl.
*H02J 7/00* (2006.01)
*H02J 7/14* (2006.01)
(Continued)

(52) U.S. Cl.
CPC .............. *B60L 53/302* (2019.02); *B60L 53/31* (2019.02); *B60L 53/60* (2019.02); *H02J 7/00309* (2020.01)

(58) Field of Classification Search
CPC ........ B60L 53/302; B60L 53/60; B60L 53/31; H02J 7/00309
(Continued)

(56) References Cited

U.S. PATENT DOCUMENTS

| | | | | |
|---|---|---|---|---|
| 5,937,664 | A | * | 8/1999 | Matsuno ............. H01M 10/625 62/186 |
| 5,945,808 | A | * | 8/1999 | Kikuchi ............... G01R 31/374 320/132 |

(Continued)

FOREIGN PATENT DOCUMENTS

| CN | 205566953 U | 9/2016 |
|---|---|---|
| CN | 206442655 U | 8/2017 |

(Continued)

*Primary Examiner* — Alexis B Pacheco
(74) *Attorney, Agent, or Firm* — WOMBLE BOND DICKINSON (US) LLP

(57) ABSTRACT

This application discloses a charging pile and a charging pile control method. The method includes: obtaining a first temperature of at least one charging apparatus that is in a first state and that is in a charging pile; obtaining a second temperature of at least one charging apparatus that is in a second state and that is in the charging pile, where the second state is a sleep state; calculating a temperature difference between the second temperature and the first temperature; determining whether the temperature difference is greater than a first threshold, where the first threshold is an upper-limit temperature of the temperature difference; and when the temperature difference is greater than the first threshold, starting a heat dissipation fan of the charging apparatus that is in the second state.

16 Claims, 5 Drawing Sheets

(51) Int. Cl.
  *B60L 53/302* (2019.01)
  *B60L 53/60* (2019.01)
  *B60L 53/31* (2019.01)

(58) Field of Classification Search
  USPC .......................................................... 320/153
  See application file for complete search history.

(56) References Cited

U.S. PATENT DOCUMENTS

| | | | | |
|---|---|---|---|---|
| 5,982,152 | A * | 11/1999 | Watanabe | ................. B60L 3/12 320/137 |
| 6,833,784 | B1 * | 12/2004 | Ishii | ....................... B60R 25/20 340/5.31 |
| 2004/0061503 | A1 * | 4/2004 | Morimoto | .......... G01R 31/3278 903/907 |
| 2005/0074048 | A1 * | 4/2005 | Wu | ....................... G01K 17/20 374/E7.042 |
| 2007/0010930 | A1 * | 1/2007 | Wu | .......................... B60L 7/16 701/99 |
| 2008/0202741 | A1 * | 8/2008 | Lee | .................... B60H 1/00278 165/104.33 |
| 2008/0280192 | A1 * | 11/2008 | Drozdz | ................. B60L 3/0046 700/297 |
| 2009/0320715 | A1 * | 12/2009 | Morita | ..................... B60L 50/64 105/51 |
| 2010/0089547 | A1 * | 4/2010 | King | ....................... B60L 58/34 903/907 |
| 2015/0202980 | A1 * | 7/2015 | Hanna | ..................... B60L 58/27 701/22 |
| 2016/0276719 | A1 * | 9/2016 | Kikuchi | .............. H01M 10/425 |
| 2020/0259229 | A1 * | 8/2020 | Wu | ..................... H01M 10/617 |

FOREIGN PATENT DOCUMENTS

| | | |
|---|---|---|
| CN | 207078015 U | 3/2018 |
| CN | 108430191 A | 8/2018 |
| CN | 108495522 A | 9/2018 |
| CN | 109885111 A | 6/2019 |
| CN | 110015022 A | 7/2019 |
| CN | 209257908 U | 8/2019 |
| CN | 110602922 A | 12/2019 |
| JP | 2011066002 A | 3/2011 |

* cited by examiner

--Prior Art--

CHARGING PILE AND CHARGING PILE CONTROL METHOD

CROSS-REFERENCE TO RELATED APPLICATIONS

This application is a continuation of International Application No. PCT/CN2020/076276, filed on Feb. 21, 2020, the disclosure of which is hereby incorporated by reference in its entirety.

TECHNICAL FIELD

This application pertains to the field of charging pile technologies, and in particular, to a charging pile and a charging pile control method.

BACKGROUND

As a type of electric devices for charging electric automobiles, charging piles are increasingly demanded with the development of electric automobiles. To implement fast charging, a charging apparatus of a charging pile generates a massive amount of heat in a process of charging an electric automobile. Therefore, a heat dissipation fan and a pile-level fan are respectively disposed on two sides of a charging apparatus of a common charging pile. The heat dissipation fan and the pile-level fan operate in coordination to cool down the charging apparatus. However, a relatively loud noise is generated when the heat dissipation fan and the pile-level fan operate at the same time, and heat dissipation also fails to reach an expected effect, affecting actual use experience of a user. Moreover, accordingly, the heat dissipation fan and the pile-level fan also occupy a relatively large space of the charging pile. This hampers charging pile design and optimization.

SUMMARY

This application provides a charging pile and a charging pile control method, to resolve technical problems of a relatively poor heat dissipation effect, a relatively loud noise, and a poor user experience effect of a common charging pile.

To resolve the foregoing technical problems, this application provides a charging pile control method, including:

obtaining a first temperature of at least one charging apparatus that is in a first state and that is in a charging pile, where the first state is an operating state, the first temperature is an ambient temperature at an air inlet of the charging apparatus that is in the first state, and each charging apparatus is provided with a heat dissipation fan;

obtaining a second temperature of at least one charging apparatus that is in a second state and that is in the charging pile, where the second state is a sleep state, and the second temperature is an ambient temperature at an air inlet of the charging apparatus that is in the second state;

calculating a temperature difference between the second temperature and the first temperature;

determining whether the temperature difference is greater than a first threshold, where the first threshold is an upper-limit temperature of the temperature difference; and when the temperature difference is greater than the first threshold, starting a heat dissipation fan of the charging apparatus that is in the second state.

By using this method, the charging pile can dissipate heat of each charging apparatus in a timely manner, so that the ambient temperatures at the air inlets of the charging apparatus that is in the first state and the charging apparatus that is in the second state are maintained within a normal range.

In some embodiments, the method further includes: when the temperature difference is less than or equal to a second threshold, turning off the heat dissipation fan of the charging apparatus that is in the second state, where the second threshold is a lower-limit temperature of the temperature difference, and the second threshold is less than or equal to the first threshold.

Therefore, after the ambient temperature at the air inlet of the charging apparatus that is in the second state is decreased to a particular degree, it can be determined that the ambient temperature at the air inlet of the charging apparatus that is in the second state is already within the normal range and does not affect charging by the charging pile. Therefore, the heat dissipation fan of the charging apparatus that is in the second state is turned off.

In some embodiments, after the determining whether the temperature difference is greater than a first threshold, the method further includes:

when the temperature difference is less than or equal to the first threshold, not starting the heat dissipation fan of the charging apparatus that is in the second state.

Therefore, it is determined, by comparing the temperature difference with the first threshold, that the ambient temperature at the air inlet of the charging apparatus that is in the second state is within the normal range. Accordingly, the heat dissipation fan of the charging apparatus that is in the second state is not started, thereby saving energy and prolonging a service life of the heat dissipation fan.

In some embodiments, after the determining whether the temperature difference is greater than a first threshold, the method further includes:

when the temperature difference is equal to the first threshold, starting the heat dissipation fan of the charging apparatus that is in the second state.

Therefore, the heat dissipation fan of the charging apparatus that is in the second state may be started according to a heat dissipation requirement based on comparison between the temperature difference and the first threshold, to prevent a potential accident of shutdown caused by an over-temperature.

In some embodiments, the obtaining a first temperature of at least one charging apparatus that is in a first state and that is in a charging pile includes: obtaining a plurality of first temperatures from a plurality of charging apparatuses that are in the first state, where a quantity of the plurality of first temperatures corresponds a quantity of charging apparatuses that are in the first state.

In some embodiments, the calculating a temperature difference between the second temperature and the first temperature includes:

obtaining, based on the plurality of first temperatures, a lowest temperature or an average temperature of the plurality of first temperatures; and comparing the second temperature with the lowest temperature of the plurality of first temperatures, to obtain the temperature difference; or comparing the second temperature with the average temperature of the plurality of first temperatures, to obtain the temperature difference.

It should be understood that when there are a plurality of charging apparatuses that are in the first state, a plurality of first temperatures can be obtained. A minimum temperature difference between the charging apparatus that is in the second state and the charging apparatuses that are in the first state is obtained accurately by comparing the lowest temperature of the plurality of first temperatures with the second temperature, thereby determining an operation needed subsequently. Alternatively, an average temperature difference between the charging apparatus that is in the second state and the charging apparatuses that are in the first state is obtained by comparing the average temperature of the plurality of first temperatures with the second temperature, thereby determining an operation needed subsequently.

In some embodiments, when there are a plurality of second temperatures, the method includes:

comparing a highest temperature of the plurality of second temperatures with the lowest temperature of the plurality of first temperatures, to obtain the temperature difference;

comparing a highest temperature of the plurality of second temperatures with the average temperature of the plurality of first temperatures, to obtain the temperature difference;

comparing a lowest temperature of the plurality of second temperatures with the lowest temperature of the plurality of first temperatures, to obtain the temperature difference;

comparing a lowest temperature of the plurality of second temperatures with the average temperature of the plurality of first temperatures, to obtain the temperature difference;

comparing an average temperature of the plurality of second temperatures with the lowest temperature of the plurality of first temperatures, to obtain the temperature difference; or comparing an average temperature of the plurality of second temperatures with the average temperature of the plurality of first temperatures, to obtain the temperature difference;

Therefore, a heat dissipation policy may be configured adaptively according to a use requirement, to decrease ambient temperatures at air inlets of the plurality of charging apparatuses that are in the second state.

In some embodiments, before the calculating a temperature difference between the second temperature and the first temperature, the method further includes:

determining whether the second temperature exceeds a third threshold, where the third threshold is an upper-limit temperature of the second temperature; and when the second temperature is greater than the third threshold, directly starting the heat dissipation fan of the charging apparatus that is in the second state; or when the second temperature is less than or equal to the third threshold, calculating the temperature difference between the second temperature and the first temperature.

Therefore, if the obtained ambient temperature at the air inlet of the charging apparatus that is in the second state is excessively high, the heat dissipation fan of the charging apparatus that is in the second state is directly started, to improve heat dissipation efficiency of the charging apparatus that is in the second state.

This application further provides a charging pile. The charging pile includes a monitor and a charging assembly.

The charging assembly includes two or more charging apparatuses, and each of the charging apparatuses is provided with a heat dissipation fan and an ambient temperature sensor.

The charging apparatuses obtain a corresponding first temperature or second temperature by using the ambient temperature sensors. The first temperature is an ambient temperature at an air inlet of a charging apparatus that is in a first state, and the second temperature is an ambient temperature at an air inlet of a charging apparatus that is in a second state. The first state is an operating state, and the second state is a sleep state.

The monitor is configured to: receive and analyze the first temperature and the second temperature, and when a temperature difference between the second temperature and the first temperature is greater than a first threshold, start a heat dissipation fan of the charging apparatus that is in the second state. The first threshold is an upper-limit temperature of the temperature difference.

Therefore, the charging pile can dissipate heat of each charging apparatus in a timely manner, so that the ambient temperatures at the air inlets of the charging apparatus that is in the first state and the charging apparatus that is in the second state are maintained within a normal range.

In some embodiments, the monitor is further configured to: when the temperature difference is less than or equal to a second threshold, turn off the heat dissipation fan of the charging apparatus that is in the second state, where the second threshold is a lower-limit temperature of the temperature difference, and the second threshold is less than or equal to the first threshold.

Therefore, after the ambient temperature at the air inlet of the charging apparatus that is in the second state is decreased to a particular degree, it can be determined that the ambient temperature at the air inlet of the charging apparatus that is in the second state is already within the normal range and does not affect charging by the charging pile. Therefore, the heat dissipation fan of the charging apparatus that is in the second state is turned off.

In some embodiments, the monitor is further configured to: when the temperature difference is less than or equal to the first threshold, not start the heat dissipation fan of the charging apparatus that is in the second state. In some other embodiments, the monitor is further configured to: when the temperature difference is equal to the first threshold, start the heat dissipation fan of the charging apparatus that is in the second state.

Therefore, it is determined, by comparing the temperature difference with the first threshold, that the ambient temperature at the air inlet of the charging apparatus that is in the second state is within the normal range. Accordingly, the heat dissipation fan of the charging apparatus that is in the second state is not started, thereby saving energy and prolonging a service life of the heat dissipation fan. Alternatively, the heat dissipation fan of the charging apparatus that is in the second state is started according to a heat dissipation requirement, to prevent a potential accident of shutdown caused by an over-temperature.

In some embodiments, the monitor is configured to: receive a plurality of first temperatures from a plurality of charging apparatuses that are in the first state, and obtain a lowest temperature or an average temperature of the plurality of first temperatures, where a quantity of the plurality of first temperatures corresponds a quantity of the charging apparatuses that are in the first state.

The monitor is further configured to: based on the lowest temperature or the average temperature of the plurality of first temperatures, compare the second temperature with the lowest temperature of the plurality of first temperatures, to obtain the temperature difference; or compare the second temperature with the average temperature of the plurality of first temperatures, to obtain the temperature difference.

It should be understood that when a plurality of charging apparatuses that are in the first state are obtained, a minimum temperature difference between the charging apparatus that is in the second state and the charging apparatuses that are in the first state is obtained accurately by comparing the lowest temperature of the plurality of first temperatures with the second temperature, thereby determining an operation needed subsequently. Alternatively, an average temperature difference between the charging apparatus that is in the second state and the charging apparatuses that are in the first state is obtained by comparing the average temperature of the plurality of first temperatures with the second temperature, thereby determining an operation needed subsequently.

In some embodiments, when there are a plurality of second temperatures, the monitor is further configured to obtain a highest temperature, a lowest temperature, or an average temperature of the plurality of second temperatures.

In addition, the monitor is configured to: compare the highest temperature of the plurality of second temperatures with the lowest temperature of the plurality of first temperatures, to obtain the temperature difference;

compare the highest temperature of the plurality of second temperatures with the average temperature of the plurality of first temperatures, to obtain the temperature difference;

compare the lowest temperature of the plurality of second temperatures with the lowest temperature of the plurality of first temperatures, to obtain the temperature difference;

compare the lowest temperature of the plurality of second temperatures with the average temperature of the plurality of first temperatures, to obtain the temperature difference;

compare the average temperature of the plurality of second temperatures with the lowest temperature of the plurality of first temperatures, to obtain the temperature difference; or compare the average temperature of the plurality of second temperatures with the average temperature of the plurality of first temperatures, to obtain the temperature difference.

Therefore, a heat dissipation policy may be configured adaptively according to a use requirement, to decrease ambient temperatures at air inlets of the plurality of charging apparatuses that are in the second state.

In some embodiments, the monitor is a component disposed in the charging assembly, and the charging apparatuses of the charging assembly communicate with each other by using the monitor. In some other embodiments, the monitor and the charging assembly are independent of each other. Therefore, different monitors may be configured for the charging pile according to a use requirement.

In some embodiments, the monitor is further configured to: determine whether the second temperature is greater than a third threshold; and when the second temperature is greater than the third threshold, directly start the heat dissipation fan of the charging apparatus that is in the second state, where the third threshold is an upper-limit temperature of the second temperature.

Therefore, if the obtained ambient temperature at the air inlet of the charging apparatus that is in the second state is excessively high, the heat dissipation fan of the charging apparatus that is in the second state is directly started, to improve heat dissipation efficiency of the charging apparatus that is in the second state.

By using the charging pile control method in this application, heat dissipation efficiency of the charging pile can be improved, to avert a possibility that charging efficiency is affected because of an excessively high temperature in the charging pile, thereby improving a user experience effect.

The heat dissipation fan of the charging apparatus that is in the second state is controlled to start in a timely manner for heat dissipation. In this way, the charging pile can be rid of a pile-level fan that is required by a common charging pile, to reduce costs of the charging pile and simplify an internal structure of the charging pile.

DESCRIPTION OF EMBODIMENTS

For a clearer understanding of technical features, purposes, and effects of this application, the embodiments of this application are detailed herein with reference to the accompanying drawings.

Figure 1:
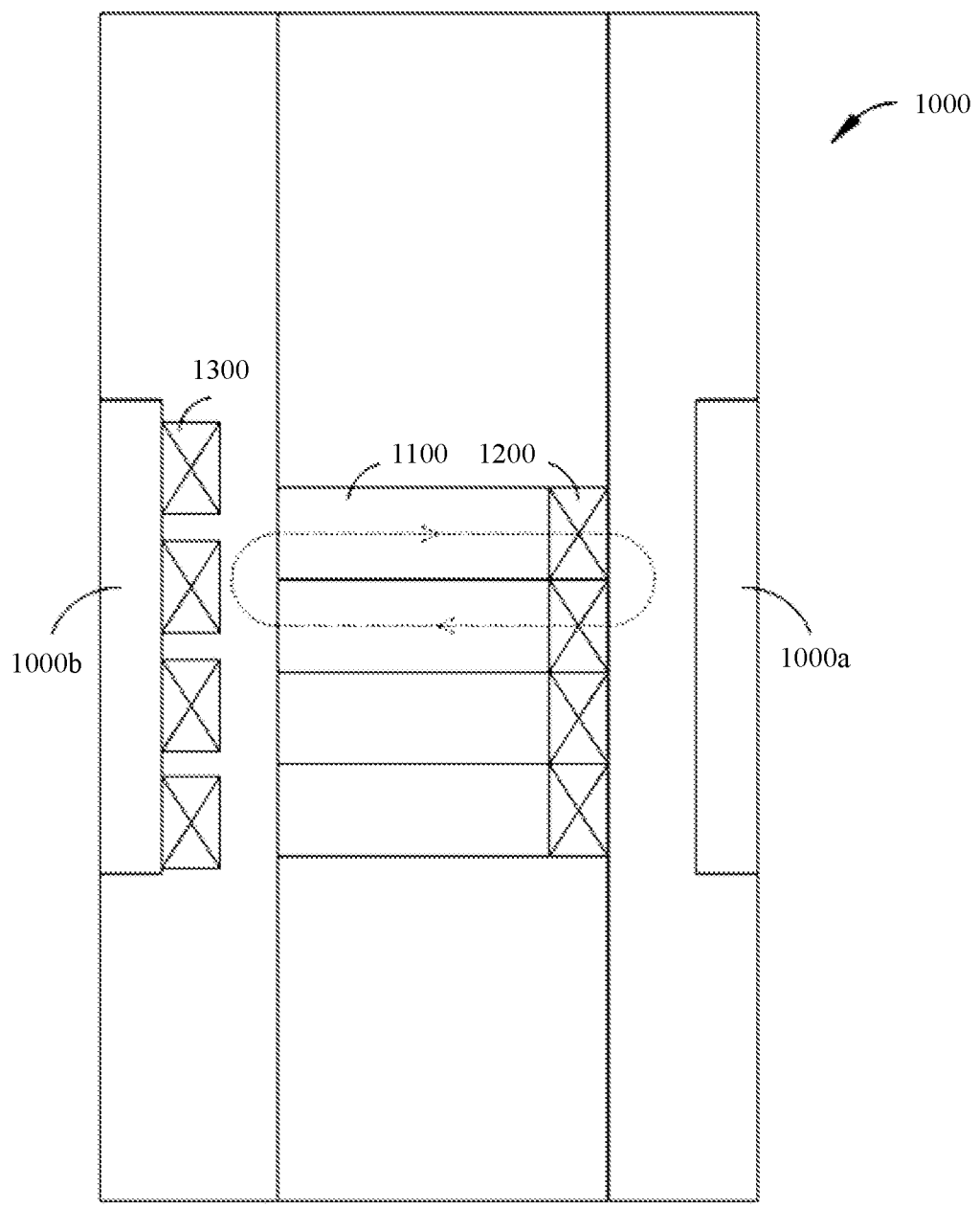
FIG. 1 is a schematic diagram of a common charging pile.

Referring to FIG. 1, a common electric-automobile charging pile 1000 charges an electric automobile by using a charging apparatus 1100, to support normal driving of the electric automobile. To support heavy-duty charging or fast charging of the electric automobile, the charging apparatus 1100 generates a massive amount of heat in a charging process. If the heat is not dissipated in a timely manner, a temperature of the charging pile 1000 becomes excessively high. This impairs charging efficiency of the charging pile 1000 or even causes the charging pile 1000 to shut down because of an over-temperature. In addition, a relatively serious security hazard is posed if the heat is not dissipated in a timely manner. Therefore, in the common charging pile 1000, the charging apparatus 1100 is disposed between an air inlet 1000a and an air outlet 1000b. A heat dissipation fan 1200 is disposed on the charging apparatus 1100, and a heavy-duty pile-level fan 1300 corresponding to the charging apparatus 1100 is also disposed on the air outlet 1000b. The heat dissipation fan 1200 and the pile-level fan 1300 operate in coordination to dissipate the heat generated by the charging apparatus 1100 during operation.

To ensure heat dissipation efficiency, a heavy-duty pile-level fan 1300 is correspondingly disposed for each charging apparatus 1100, to dissipate heat for the charging apparatus 1100. However, the pile-level fan 1300 is relatively large in volume, has relatively high energy consumption, and generates a relatively loud noise during operation, resulting in a poor user experience effect and also resulting in weak product competitiveness of the charging pile 1000.

Moreover, when only some charging apparatuses 1100 in the common charging pile 1000 are operating, the operating charging apparatuses 1100 generate hot air that carries a massive amount of heat. Because of an air suction effect of an operating heat dissipation fan 1200, the hot air flows back into air inlets of the operating charging apparatuses 1100 through a non-operating charging apparatus 1100, as indicated by a dashed line in FIG. 1. Therefore, normal operation of the common charging pile 1000 is affected because a temperature at an air inlet of the non-operating charging apparatus 1100 increases abnormally. When the pile-level fan 1300 decreases a rotational speed or stops rotating due to a fault, the charging pile 1000 is more severely affected.

To revolve the foregoing problem, embodiments of this application provide a charging pile and a charging pile control method, which can improve heat dissipation efficiency of the charging pile, to avert a possibility that charging efficiency is affected because of an excessively high temperature in the charging pile. Moreover, the charging pile can be rid of a pile-level fan that is required by a common charging pile, to reduce costs and simplify an internal structure of the charging pile.

Figure 2:
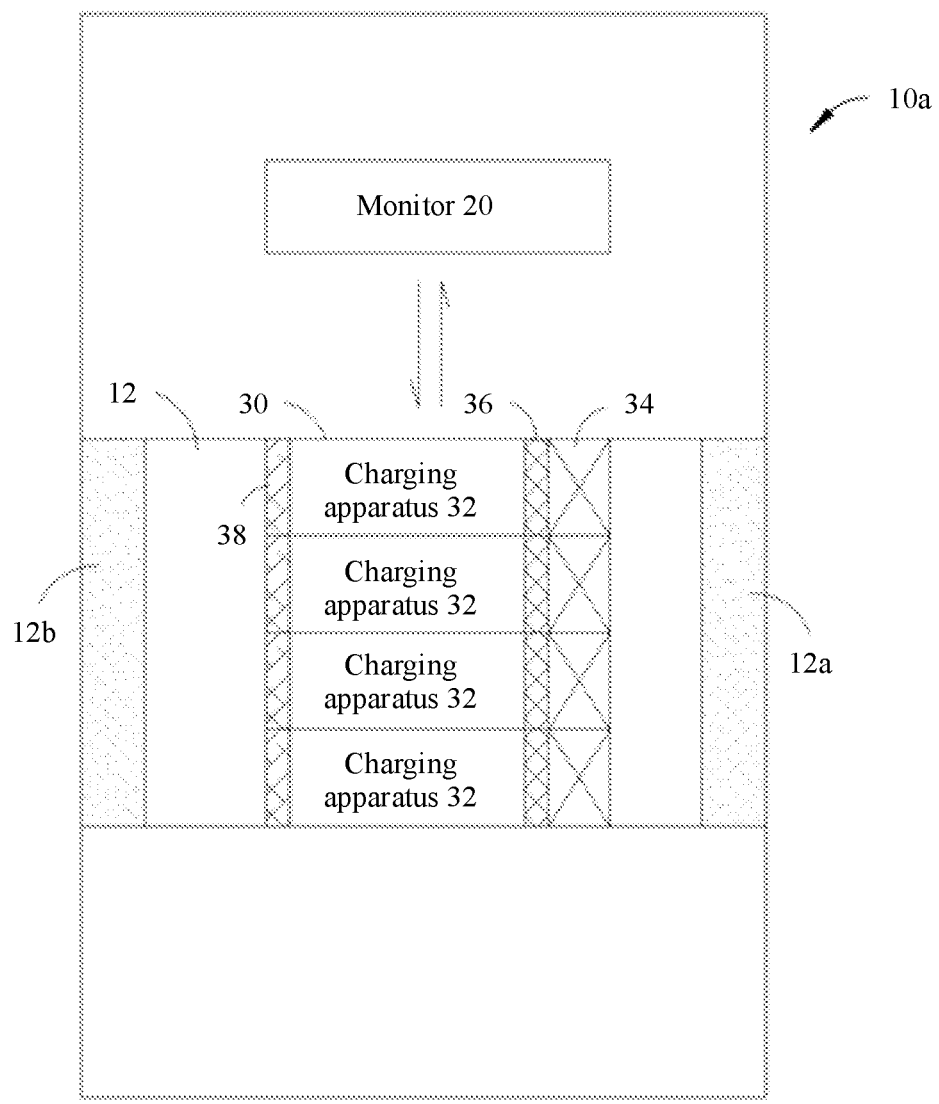
FIG. 2 is a schematic diagram of a charging pile according to an embodiment of this application.
Figure 3:
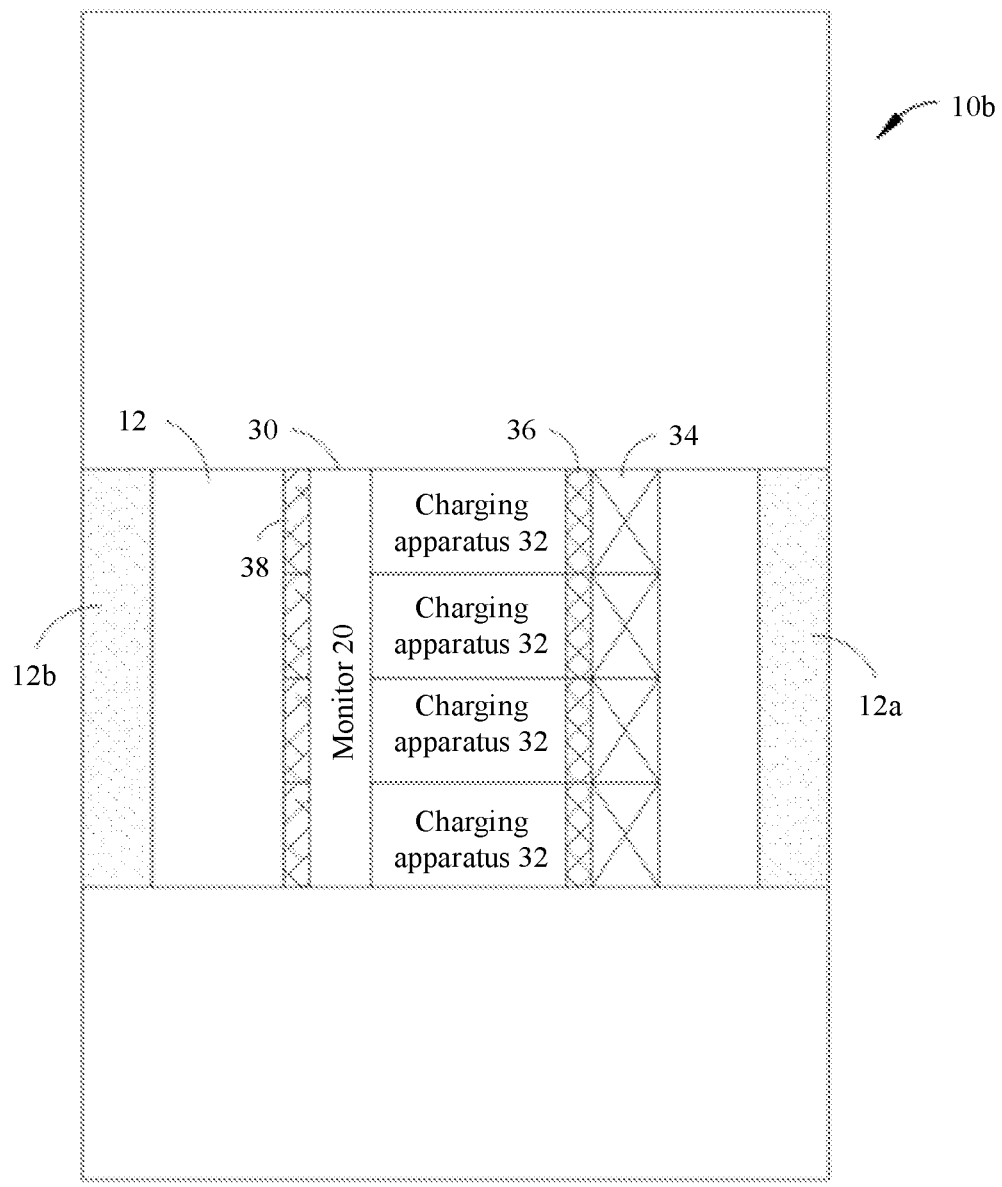
FIG. 3 is a schematic diagram of another charging pile according to an embodiment of this application.

Referring to both FIG. 2 and FIG. 3, embodiments of this application provide charging piles (10a and 10b).

The charging piles (10a and 10b) each include a heat dissipation cavity 12, a monitor 20, and a charging assembly 30. The heat dissipation cavity 12 is provided with an air inlet 12a and an air outlet 12b that allow for cross ventilation, and is configured to accommodate the charging assembly 30. In this way, the relatively independent heat dissipation cavity can facilitate heat dissipation for the charging assembly 30, so that the heat dissipation cavity has a relatively proper operating temperature, thereby implementing fast charging of an electric automobile.

The charging assembly 30 includes two or more charging apparatuses 32. These charging apparatuses 32 are configured to charge an electric automobile. To promptly discharge heat generated by the charging apparatuses 32 during operation, these charging apparatuses 32 are disposed in an area between the air inlet 12a and the air outlet 12b. Correspondingly, each charging apparatus 32 is further provided with a heat dissipation fan 34. The heat dissipation fan 34 is configured to blow away heat generated by the corresponding charging apparatus 32 during operation, and discharge the heat through the air outlet 12b.

To simplify analysis and facilitate understanding of the technical solutions of this application, the following example is used for description in the embodiments: There are four charging apparatuses 32, three of which are charging apparatuses 32 in a first state and one of which is a charging apparatus 32 in a second state. The first state is an operating state, and the second state is a sleep state. It should be understood that the second state can be considered as a temporarily non-operating state. Correspondingly, each charging apparatus may switch between the first state and the second state as required. For example, a charging apparatus 32 is in the second state at a current moment, but at a next moment, the charging apparatus 32 switches to the first state in response to an instruction.

In some other embodiments, the charging pile may alternatively include five charging apparatuses. Alternatively, based on different required powers, the four charging apparatuses include two charging apparatuses in the first state and two charging apparatuses in the second state. This is not limited.

In each embodiment, an uppermost charging apparatus is assumed as a charging apparatus in the second state, and three lower charging apparatuses are assumed as charging apparatuses in the first state.

Referring to FIG. 1, in the common charging pile 1000, when three lower charging apparatuses 1100 operate normally, heat dissipation fans 1200 of the three charging apparatuses 1100 are all started, to discharge, through the air outlet 1000b of the charging pile 1000, heat generated by the three charging apparatuses 1100 in an operation process. However, in the common charging pile 1000, four pile-level fans 1300 for coordinated heat dissipation are further disposed at positions at the air outlet 1000b. These pile-level fans 1300 coordinate with the heat dissipation fans 1200 to carry off hot air that is blown to a tail part of the charging apparatus 1100.

However, the charging apparatus 1100 that is in the second state and its related structure in the charging pile 1000 are not started. Moreover, the heat dissipation fans 1200 of the charging apparatuses 1100 that are in the first state are operating. Consequently, under an action of a temperature difference and an atmospheric pressure difference, the charging apparatus 1100 that is in the second state actually forms a backflow path with the charging apparatuses 1100 that are in the first state. In this case, hot air blown by the heat dissipation fans 1200 to the tail part of the charging apparatus 1100 easily flows back to air inlets of the operating charging apparatuses 1100 through the charging apparatus 1100 that is in the second state. This becomes more severe through circulation on the backflow path. As a result, an ambient temperature at the air inlet of the charging apparatus 1100 increases abnormally. This impairs efficiency of charging an electric automobile by the charging pile 1000, or even causes the charging pile 1000 to shut down abnormally.

To address the foregoing problems, each charging apparatus 32 in the embodiments is provided with an ambient temperature sensor 36. The ambient temperature sensor 36 is configured to obtain an ambient temperature at an air inlet of the corresponding charging apparatus 32. When the charging apparatus 32 is in the first state and outputs a power, the ambient temperature at the air inlet correspondingly obtained by the ambient temperature sensor 36 is used as a first temperature. When the charging apparatus 32 is in the second state and does not output a power, the ambient temperature at the air inlet correspondingly obtained by the ambient temperature sensor 36 is used as a second temperature.

In some embodiments, the first temperature or the second temperature obtained by using the ambient temperature sensor 36 is uploaded to the monitor 20. Referring to FIG. 2, in the charging pile 10a provided in the embodiments of this application, the monitor 20 is located outside the charging assembly 30, so that the monitor 20 and the charging assembly are independent of each other. Referring to FIG. 3, in another charging pile 10b provided in the embodiments of this application, the monitor 20 may be a component configured in the charging assembly 30. In one embodiment, the monitor 20 is integrated into the charging assembly 30 as a part of the charging assembly 30, to reduce space occupied by the monitor 20 and the charging assembly 30 and leave more space for implementing heat dissipation or accommodating other components.

Therefore, different monitors 20 may be configured for the charging pile 10 according to a use requirement. In addition, the charging apparatuses 32 of the charging assembly 30 may also communicate with each other by using the monitor 20.

In some embodiments, the ambient temperature sensor 36 in each charging apparatus 32 uploads the obtained first temperature or second temperature to the monitor 20 for analysis by the monitor 20. Correspondingly, the monitor 20 determines, based on the temperature information, whether a temperature difference between the second temperature and the first temperature is greater than a first threshold, to determine whether to control the charging apparatus 32 that is in the second state to perform a related heat dissipation operation.

It should be understood that the first threshold is an upper-limit temperature of the temperature difference. The first threshold may be a positive number, a negative number, or zero. A corresponding operation is performed depending on different relationships between the temperature difference and the first threshold.

Therefore, a value of the first threshold may be adjusted as required. For example, the first threshold is −3° C., −2° C., −1° C., 0° C., 1° C., 2° C., or 3° C. Correspondingly, the charging piles (10a and 10b) provided in the embodiments may be applied to scenarios such as an underground garage or an outdoor parking lot. The first threshold and a second threshold that is mentioned below may or may not vary with different scenarios. This is not limited.

Figure 4:
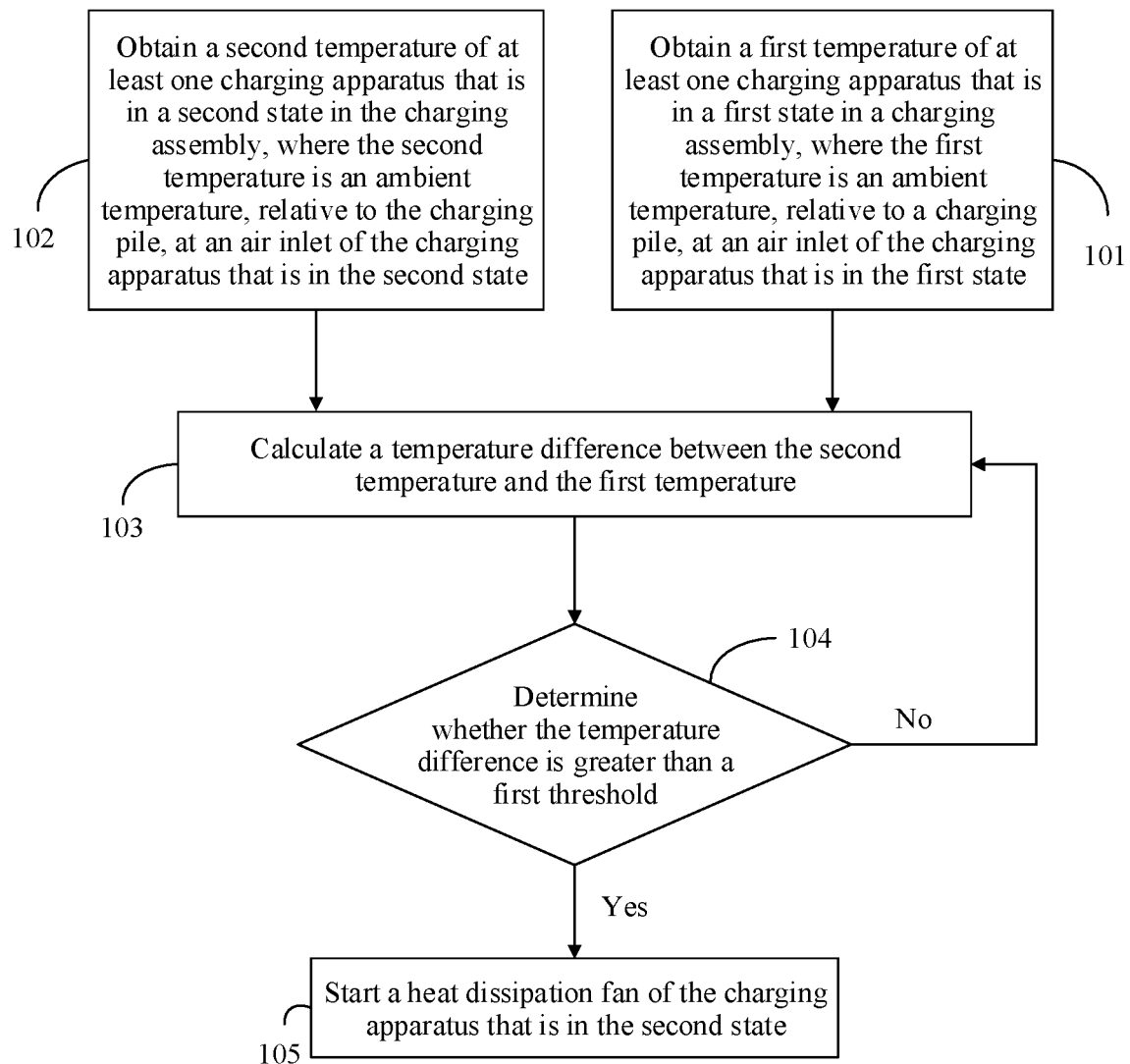
FIG. 4 is a flowchart of a charging pile control method according to an embodiment of this application.

In addition, referring to FIG. 2 to FIG. 4 at the same time, the monitor 20 in each embodiment is further configured to: when the obtained second temperature exceeds a third threshold, directly start a heat dissipation fan 34 of the charging apparatus 32 that is in the second state, where the third threshold is an upper-limit temperature of the second temperature.

It should be understood that if an ambient temperature at an air inlet of the charging apparatus 32 that is in the second state is continuously greater than the third threshold within a period of time, charging efficiency of the charging pile may be reduced and a service life of the charging pile may be shortened. Therefore, when the obtained ambient temperature at the air inlet of the charging apparatus 32 that is in the second state is excessively high, the monitor 20 directly starts the heat dissipation fan 34 of the charging apparatus 32 that is in the second state, to improve heat dissipation efficiency of the charging apparatus 32 that is in the second state and decrease the ambient temperature at the air inlet of the charging apparatus 32 in a timely manner. For example, when the third threshold is 50° C. and the second temperature is 51° C., 50° C.<51° C. The monitor 20 determines that the ambient temperature at the air inlet of the charging apparatus 32 that is in the second state exceeds the third threshold, and directly starts the heat dissipation fan 34 of the charging apparatus 32 that is in the second state.

The following uses the charging pile 10a as an example for description.

FIG. 2 shows the charging pile 10a provided in the embodiments of this application. The monitor 20 and the charging assembly 30 in the charging pile 10a are independent of each other. Each charging apparatus 32 obtains the first temperature or the second temperature by using the corresponding ambient temperature sensor 36 and uploads the first temperature or the second temperature to the monitor 20. The monitor 20 calculates the temperature difference between the second temperature and the first temperature based on the obtained temperature information (that is, the first temperature and the second temperature). In this way, the monitor 20 can determine whether the temperature difference is greater than the first threshold, and when the temperature difference is greater than the first threshold, start the heat dissipation fan 34 of the charging apparatus 32 that is in the second state.

It should be understood that the monitor 20 in this embodiment monitors each charging apparatus 32 of the charging assembly 30 and controls each charging apparatus 32 to perform a related operation. The monitor 20 determines a temperature difference of the charging apparatus 32 that is in the second state relative to the charging apparatuses 32 that are in the first state. When the temperature difference between the second temperature and the first temperature is greater than the first threshold because the ambient temperature at the air inlet of the charging apparatus 32 that is in the second state is abnormal, the monitor 20 controls the heat dissipation fan 34 of the charging apparatus 32 that is in the second state to start. Hot air is discharged by the heat dissipation fan 34 through the air outlet 12b of the charging pile 10a, to carry off heat accumulated on the charging apparatus 32 that is in the second state and decrease the ambient temperature at the air inlet of the charging apparatus 32, thereby ensuring normal operation of the charging pile 10a and charging of an electric automobile.

In some other embodiments, the monitor 20 is further configured to: when the temperature difference is less than the first threshold, make the charging apparatus 32 that is in the second state stay in the current state. It should be understood that if the monitor 20 determines, after comparing the temperature difference with the first threshold, that the ambient temperature at the air inlet of the charging apparatus 32 that is in the second state is within a normal range, the monitor 20 does not need to start the heat dissipation fan 34 of the charging apparatus 32 that is in the second state.

In some embodiments, when there are a plurality of charging apparatuses 32 that are in the first state, a plurality of first temperatures can be obtained accordingly. It should be understood that a quantity of the plurality of first temperatures is the same as a quantity of the charging apparatuses 32 that are in the first state. In other words, each charging apparatus 32 in the first state corresponds to one first temperature. The monitor 20 receives and analyzes these first temperatures, obtains a lowest temperature of these first temperatures, and compares the second temperature with the lowest temperature to obtain the temperature difference.

For ease of understanding, the ambient temperature at the air inlet of the charging apparatus that is in the second state is denoted as T0, an ambient temperature at an air inlet of a charging apparatus that is in the first state is denoted as T1, a lowest temperature of the plurality of first temperatures T1s is denoted as T11, and the first threshold is denoted as ΔT1.

The foregoing four charging apparatuses 32 are still used as an example for description. Because there are three charging apparatuses 32 that are in the first state, three T1s can be obtained accordingly. For examples, ambient temperatures T1s at air inlets of the three charging apparatuses 32 that are in the first state are respectively 47° C., 48° C., and 49° C. The lowest temperature T11 obtained by the monitor 20 through analysis is 47° C.

Based on the three T1s, the monitor 20 compares T0 with T11 of the three T1s that has a lowest value, to obtain the temperature difference T0−T11. For example, the obtained second temperature T0 is 49.5° C. The temperature difference T0−T11 between the second temperature T0 and the lowest temperature T11 is 2.5° C.

In some embodiments, when the first threshold ΔT1 is set to 1° C., the monitor 20 can learn, by comparing the temperature difference T0−T11 with the first threshold ΔT1, that (T0−T11)>ΔT1. Therefore, the monitor 20 determines that the ambient temperature at the air inlet of the charging apparatus 32 that is in the second state is excessively high, and starts the corresponding heat dissipation fan 34, to decrease the ambient temperature at the air inlet of the charging apparatus 32 that is in the second state.

In some other embodiments, when the first threshold ΔT1 is set to 3° C., the monitor 20 can learn, by comparing the temperature difference T0−T11 with the first threshold ΔT1, that (T0−T11)<ΔT1. Therefore, the monitor 20 determines that the ambient temperature at the air inlet of the charging apparatus 32 that is in the second state is within the normal range, and in this case, does not start the heat dissipation fan of the charging apparatus 32 that is in the second state.

In some embodiments, the monitor 20 may alternatively compare the second temperature with an average temperature of the plurality of first temperatures. In one embodiment, the monitor 20 receives and analyzes these first temperatures, obtains the average temperature of these first temperatures, and compares the second temperature with the average temperature to obtain the temperature difference.

The average temperature of the plurality of first temperatures T1s is denoted as T12. The foregoing four charging apparatuses 32 are correspondingly used as an example for description. Ambient temperatures T1s at air inlets of the three charging apparatuses 32 that are in the first state are respectively 47° C., 48° C., and 49° C. The average temperature T12 obtained by the monitor 20 through analysis is 48° C. The second temperature T0 obtained by the monitor 20 is 49.5° C. Therefore, the temperature difference T0–T12 between the second temperature T0 and the lowest average T12 is 1.5° C.

In some embodiments, when the first threshold $\Delta T1$ is set to 1° C., the monitor 20 can learn, by comparing the temperature difference T0–T12 with the first threshold $\Delta T1$, that (T0–T12)>$\Delta T1$ Therefore, the monitor 20 determines that the ambient temperature at the air inlet of the charging apparatus 32 that is in the second state is excessively high, and starts the corresponding heat dissipation fan 34, to decrease the ambient temperature at the air inlet of the charging apparatus 32 that is in the second state.

In some other embodiments, when the first threshold $\Delta T1$ is set to 3° C., the monitor 20 can learn, by comparing the temperature difference T0–T12 with the first threshold $\Delta T1$, that (T0–T12)<$\Delta T1$. Therefore, the monitor 20 determines that the ambient temperature at the air inlet of the charging apparatus 32 that is in the second state is within the normal range, and in this case, does not start the corresponding heat dissipation fan 34.

When the temperature difference (T0–T11 or T0–T12) is the same as the first threshold $\Delta T1$, in some embodiments, the heat dissipation fan 34 of the charging apparatus 32 that is in the second state is started; however, in some other embodiments, the heat dissipation fan of the charging apparatus 32 that is in the second state is not started. Therefore, a corresponding heat dissipation control policy may be configured adaptively for the charging pile 10a, to meet different use requirements.

Correspondingly, for example, the obtained temperature difference is T0–T11. When the first threshold $\Delta T1$ is set to 2.5° C., the monitor 20 can learn, by comparing the temperature difference T0–T11 with the first threshold $\Delta T1$, that (T0–T11)=$\Delta T1$ Therefore, the monitor 20 determines that the ambient temperature at the air inlet of the charging apparatus 32 that is in the second state is within the normal range, and in this case, does not start the heat dissipation fan of the charging apparatus 32 that is in the second state.

In some other embodiments, when the first threshold $\Delta T1$ is set to 2.5° C., the monitor 20 can learn, by comparing the temperature difference T0–T11 with the first threshold $\Delta T1$, that (T0–T11)=$\Delta T1$ Therefore, the monitor 20 determines that the ambient temperature at the air inlet of the charging apparatus 32 that is in the second state is relatively high and that cooling processing needs to be performed to prevent a potential accident of shutdown caused by an over-temperature, and in this case, starts the heat dissipation fan 34 of the charging apparatus 32 that is in the second state.

In some embodiments, the monitor 20 is further configured to: when the temperature difference is less than or equal to the second threshold, turn off the heat dissipation fan 34 of the charging apparatus 32 that is in the second state.

It should be understood that the second threshold is a lower-limit temperature of the temperature difference. The second threshold is denoted as LT2, and the second threshold LT2 is less than or equal to the first threshold $\Delta T1$ Therefore, after the ambient temperature at the air inlet of the charging apparatus 32 that is in the second state is decreased to a particular degree, the monitor 20 may determine that the ambient temperature at the air inlet of the charging apparatus 32 that is in the second state is already within the normal range and does not affect charging by the charging pile 10a, and in this case, turn off the heat dissipation fan 34 of the charging apparatus 32 that is in the second state.

For example, $\Delta T1=\Delta T2=2.5°$ C. When the temperature difference is greater than 2.5° C., the monitor 20 starts the heat dissipation fan 34 of the charging apparatus 32 that is in the second state, to carry off heat accumulated on the charging apparatus 32 and decrease the ambient temperature at the air inlet of the charging apparatus 32. When the temperature difference is less than 2.5° C., the monitor 20 determines that the ambient temperature at the air inlet of the charging apparatus 32 that is in the second state is within the normal range, and turns off the heat dissipation fan 34 of the charging apparatus 32 that is in the second state.

For another example, $\Delta T1=3°$ C., and $\Delta T2=1°$ C. When the temperature difference is greater than 3° C., the monitor 20 starts the heat dissipation fan 34 of the charging apparatus 32 that is in the second state, to carry off heat accumulated on the charging apparatus 32 and decrease the ambient temperature at the air inlet of the charging apparatus 32. When the temperature difference is decreased to a value less than 1° C., the monitor 20 determines that the ambient temperature at the air inlet of the charging apparatus 32 that is in the second state is within the normal range, and in this case, turns off the heat dissipation fan 34 of the charging apparatus 32 that is in the second state.

In some embodiments, when there are a plurality of charging apparatuses 32 that are in the second state, each charging apparatus 32 that is in the second state has an ambient temperature at an air inlet. In other words, the monitor 20 can obtain a plurality of second temperatures corresponding to the plurality of charging apparatuses 32 that are in the second state. It should be understood that the plurality of second temperatures in this embodiment are at least two second temperatures. Correspondingly, the plurality of second temperatures include a second temperature with a higher value and a second temperature with a lower value.

For ease of understanding, an example is used for brief description in which the charging assembly 30 includes two charging apparatuses 32 that are in the second state. Two second temperatures can be obtained from the two charging apparatuses 32 that are in the second state. When the two second temperatures are of different values, the two second temperatures include a temperature of a higher value and a temperature of a lower value. For example, the two second temperatures are 49° C. and 51° C. A highest temperature, a lowest temperature, and an average temperature of the two second temperatures are respectively 51° C., 49° C., and 50° C. When the two second temperatures are of a same value, the value of the second temperatures is the highest temperature, the lowest temperature, and the average temperature at the same time. For example, when the two second temperatures are both 50° C., the highest temperature, the lowest temperature, and the average temperature of the two second temperatures are all 50° C.

In this case, in the charging pile 10a provided in the embodiments of this application, the monitor 20 may obtain a highest temperature, a lowest temperature, or an average temperature of the plurality of second temperatures; use the highest temperature, the lowest temperature, or the average temperature as an overall second temperature of the plurality of charging apparatuses 32 that are in the second state; and compare the overall second temperature with the first temperature to obtain the temperature difference. Therefore, a heat dissipation policy may be configured adaptively according to a use requirement, to decrease ambient temperatures at air inlets of the plurality of charging apparatuses 32 that are in the second state.

Based on this, in some embodiments, the monitor 20 may compare the highest temperature of the plurality of second temperatures with the lowest temperature of the plurality of first temperatures, to obtain the temperature difference. Alternatively, the monitor 20 may compare the highest temperature of the plurality of second temperatures with the average temperature of the plurality of first temperatures, to obtain the temperature difference.

In some other embodiments, the monitor 20 may compare the lowest temperature of the plurality of second temperatures with the lowest temperature of the plurality of first temperatures, to obtain the temperature difference. Alternatively, the monitor 20 may compare the lowest temperature of the plurality of second temperatures with the average temperature of the plurality of first temperatures, to obtain the temperature difference.

In some other embodiments, the monitor 20 compares the average temperature of the plurality of second temperatures with the lowest temperature of the plurality of first temperatures, to obtain the temperature difference. Alternatively, the monitor 20 may compare the average temperature of the plurality of second temperatures with the average temperature of the plurality of first temperatures, to obtain the temperature difference.

FIG. 3 shows another charging pile 10b provided in the embodiments of this application. In comparison with the charging pile 10a in the foregoing embodiments, the monitor 20 is configured in the charging assembly 30. Correspondingly, the charging apparatuses 32 of the charging pile 10b may communicate with each other by using the monitor 20.

It should be understood that, in the charging pile 10b illustrated in FIG. 3, there is one monitor 20, and the monitor 20 is separately connected to the plurality of charging apparatuses 32, to receive ambient temperatures at air inlets of the charging apparatuses 32. However, this does not limit a quantity of monitors 20. In some other embodiments, the charging pile may be provided with monitors 20 of a same quantity as the charging apparatuses 32. For example, there are four charging apparatuses 32. Then, the charging pile is correspondingly provided with four monitors 20, and the four monitors 20 are respectively disposed in the four charging apparatuses 32. Correspondingly, the four monitors 20 can communicate with each other, to share with each other respectively obtained ambient temperatures at the air inlets of the charging apparatuses 32. In this way, the four monitors 20 can perform the operations in the foregoing embodiments based on the ambient temperatures at the air inlets.

Referring to both FIG. 2 and FIG. 3, it should be understood that each charging apparatus 32 in the charging piles (10a and 10b) provided in the embodiments may further be provided with a component temperature sensor 38. The component temperature sensor 38 is configured to obtain an internal temperature of the corresponding charging apparatus 32. When all of the charging apparatuses 32 are operating or none of the charging apparatuses 32 are operating, the monitor 20 may obtain internal temperatures of these charging apparatuses 32. The monitor 20 controls operation of heat dissipation fans 34 of the charging apparatuses 32 based on the internal temperatures and corresponding first temperatures in a preset speed adjustment manner.

In the preset speed adjustment manner, rotational speeds of the heat dissipation fans are preset based on the internal temperatures and the first temperature. For example, the preset speed adjustment manner is in a form of a curve, a table, a formula, or a logical expression. This is not limited. In this way, during actual operation of the heat dissipation fans, the rotational speeds of the heat dissipation fans are controlled in the preset speed adjustment manner, to promptly discharge heat generated by an operating charging apparatus.

It should be understood that, in the charging piles (10a and 10b) in the foregoing embodiments, the monitor 20 may further monitor information such as an output voltage and an output power of the charging assembly 30, to implement charging, information monitoring, or other functions.

In addition, the charging piles (10a and 10b) in the embodiments may further be provided with some essential or non-essential components.

In some embodiments, the charging piles (10a and 10b) each further include a fee calculator. The fee calculator is connected to the monitor 20 and is configured to convert information about electric energy consumed in a charging process into corresponding fee information. A provider or a lessor of the charging piles (10a and 10b) may collect related fees from a user based on the fee information.

In some embodiments, the charging piles (10a and 10b) each include a pile-level fan. The pile-level fan is disposed at a position at the air outlet 12b and coordinates with the heat dissipation fans 34 to perform heat dissipation. When a heat dissipation fan 34 is faulty, the monitor 20 or the corresponding charging apparatus 32 that is in the first state or the second state may control the corresponding pile-level fan to increase a rotational speed, to improve heat dissipation efficiency of the charging apparatus 32.

In some embodiments, the air inlet 12a and the air outlet 12b of the charging piles (10a and 10b) each may be provided with a waterproof structure and/or a dust filter. The waterproof structure can reduce a possibility of water mist infiltrating into the charging piles (10a and 10b), and the dust filter can reduce a possibility of dust or garbage particles entering the charging piles (10a and 10b), thereby ensuring normal operation of structures such as the charging assembly 30.

Referring to FIG. 4, an embodiment of this application further provides a charging pile control method. The control method may include but is not limited to the following operations.

101. Obtain a first temperature of at least one charging apparatus that is in a first state in a charging assembly, where the first temperature is an ambient temperature an air inlet of the charging apparatus that is in the first state.

Corresponding to the charging piles (10a and 10b) in the foregoing embodiments, the charging assembly may include two or more charging apparatuses. Therefore, based on a power required by an electric automobile, a corresponding quantity of charging apparatuses in the charging pile may be selectively called to output the required power. In some embodiments, in a process of charging the electric automobile, the charging pile includes a charging apparatus that is in the first state and a charging apparatus that is in a second state.

102. Obtain a second temperature of at least one charging apparatus that is in the second state in the charging assembly, where the second temperature is an ambient temperature, relative to the charging pile, at an air inlet of the charging apparatus that is in the second state.

It should be understood that there is no particular order between operation 101 and operation 102. In one embodiment, operation 101 may be performed prior to operation 102, operation 102 may be performed prior to operation 101, or operation 101 and operation 102 may be performed simultaneously. This is not limited.

According to operation 102, each charging apparatus may be provided with an ambient temperature sensor. The ambient temperature sensor may be configured to obtain an ambient temperature at an air inlet of the charging apparatus, that is, correspondingly obtain the first temperature or the second temperature based on a status of the charging apparatus. In the embodiments, the ambient temperature sensor obtains the ambient temperature at the air inlet of the corresponding charging apparatus. In this way, the charging pile in the embodiments is enabled to monitor a temperature condition of each charging apparatus in real time or at an interval, to reduce a possibility of an accident caused because a temperature at an air inlet of the charging pile is relatively high.

103. Calculate a temperature difference between the second temperature and the first temperature.

The first temperature and the second temperature are analyzed based on the foregoing obtained first temperature and second temperature. A temperature difference of the charging apparatus that is in the second state relative to the charging apparatus that is in the first state may be determined by analyzing respective temperature environments of the charging apparatus that is in the first state and the charging apparatus that is in the second state, and a related operation is performed based on the temperature difference, to ensure normal operation of the charging pile.

104. Determine whether the temperature difference is greater than a first threshold.

It should be understood that the first threshold is an upper-limit temperature of the temperature difference. The first threshold may be a positive number, a negative number, or zero. A corresponding operation is performed depending on different relationships between the temperature difference and the first threshold.

Therefore, a value of the first threshold may be adjusted as required. For example, the first threshold is −3° C., −2° C., −1° C., 0° C., 1° C., 2° C., or 3° C.

105. When the temperature difference is greater than the first threshold, start a heat dissipation fan of the charging apparatus that is in the second state.

According to this operation, when the temperature difference is greater than the first threshold because the ambient temperature at the air inlet of the charging apparatus that is in the second state is abnormal, the heat dissipation fan of the charging apparatus that is in the second state is started. Hot air is discharged by the heat dissipation fan through an air outlet of the charging pile, to carry off heat accumulated on the charging apparatus and decrease the ambient temperature at the air inlet of the charging apparatus that is in the second state, thereby ensuring normal operation of the charging pile and charging of the electric automobile. It should be understood that a rotational speed of a heat dissipation fan corresponding to each charging apparatus can be adjusted adaptively as required after the heat dissipation fan is started. For example, speed adjustment control is performed for each heat dissipation fan in a PWM manner. This is not limited.

The charging pile based on this control method can dissipate heat of each charging apparatus in a timely manner, so that the ambient temperatures at the air inlets of the charging apparatus that is in the first state and the charging apparatus that is in the second state are maintained within a normal range. In some implementations, the control method can be used to prevent a risk of over-temperature-induced shutdown of the charging pile, thereby improving user experience in using the charging pile. In some implementations, according to the control method, the charging pile may not be provided with a pile-level fan. This simplifies a structure of the charging pile, reduces costs of the charging pile, and can reduce to some extent a noise generated in a charging process of the charging pile to provide a relatively comfortable charging environment.

To simplify analysis and facilitate understanding of the technical solutions of this application, the following example is used for description in the embodiments: The charging assembly of the charging pile includes four charging apparatuses, three of which are charging apparatuses in the first state and one of which is a charging apparatus in the second state.

The four charging apparatuses are disposed in a stacking manner. An uppermost charging apparatus is assumed as a charging apparatus in the second state, and three lower charging apparatuses are assumed as charging apparatuses in the first state. When the three lower charging apparatuses operate normally, heat dissipation fans of the three charging apparatuses are all started, to discharge, through the air outlet of the charging pile, heat generated by the three charging apparatuses in an operation process. However, in a common charging pile, a hot air backflow path is easily formed between an operating charging apparatus and a non-operating charging apparatus. As a result, ambient temperatures at air inlets of the charging apparatuses increase abnormally. This reduces efficiency of charging an electric automobile by the charging pile.

In view of this, in the control method according to the embodiments, ambient temperatures at air inlets of the four charging apparatuses are monitored, and a heat dissipation fan of the charging apparatus that is in the second state is started when an ambient temperature at an air inlet of the charging apparatus that is in the second state increases abnormally. In this way, the heat dissipation fan can blow away hot air that flows back through the charging apparatus that is in the second state, to interrupt hot air flow circulation between the charging apparatus that is in the second state and the charging apparatuses that are in the first state and reduce a possibility of an accident caused because temperatures of the charging apparatuses increase.

In addition to including the foregoing operations 101 to 105, after operation 104, the charging pile control method provided in the embodiments of this application may further include the following operation of:

when the temperature difference is less than the first threshold, not starting the heat dissipation fan of the charging apparatus that is in the second state.

In this operation, it is determined, by comparing the temperature difference with the first threshold, that the ambient temperature at the air inlet of the charging apparatus that is in the second state is within the normal range. Therefore, the heat dissipation fan of the charging apparatus that is in the second state is not started, thereby saving energy and prolonging a service life of the heat dissipation fan. Referring to FIG. 4 again, it should be understood that in operation 104, determining of the temperature difference is still performed, and when the temperature difference is greater than the first threshold, operation 105 is performed.

Figure 5:
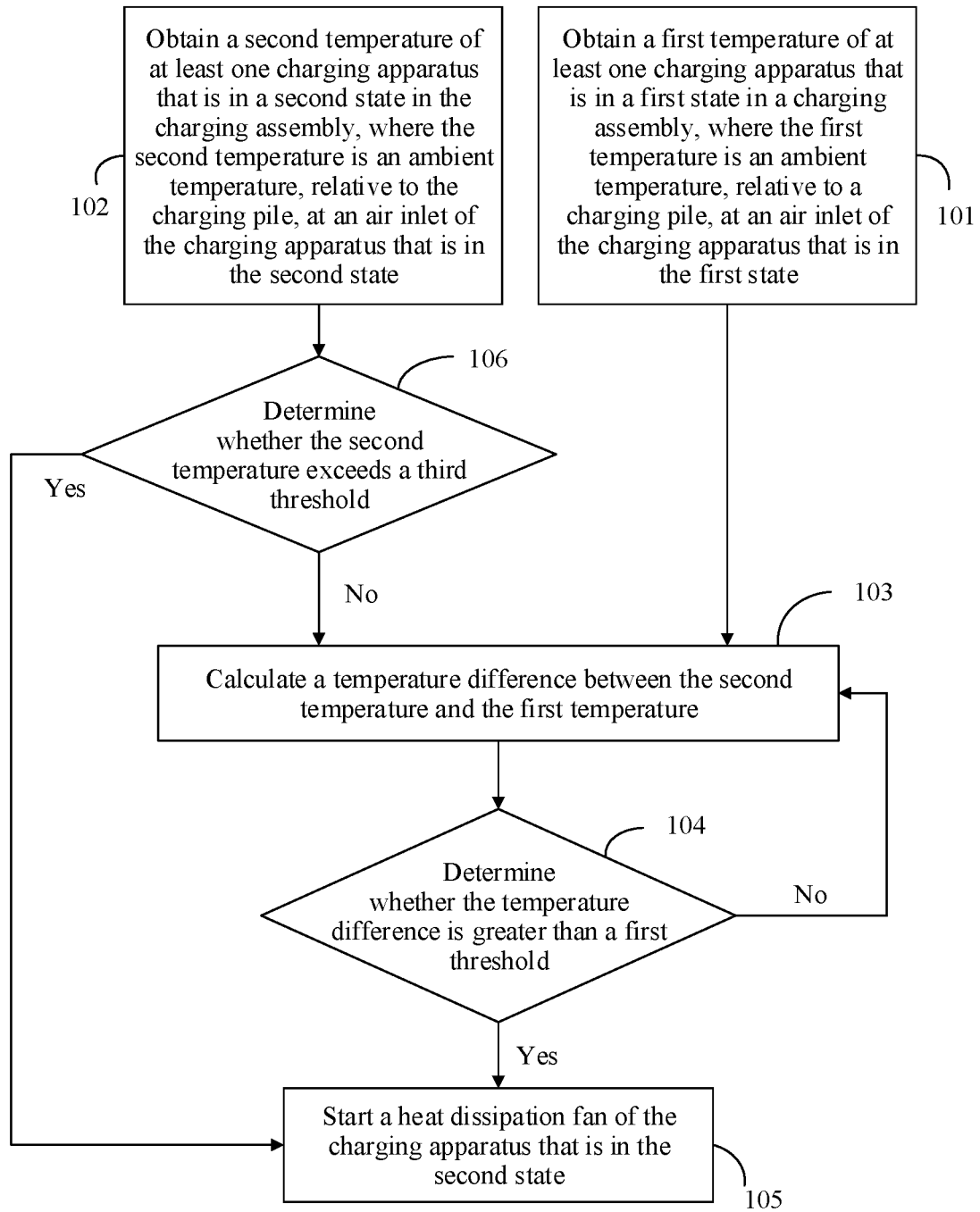
FIG. 5 is a flowchart of another charging pile control method according to an embodiment of this application.

Referring to FIG. 5, to improve heat dissipation efficiency of the charging apparatus that is in the second state, this application further provides another charging pile control method. Compared with the method in the foregoing embodiments, this method further includes the following operation before operation 103:

106: Determine whether the second temperature exceeds a third threshold.

In this operation, if the obtained ambient temperature at the air inlet of the charging apparatus that is in the second state is excessively high, the heat dissipation fan of the charging apparatus that is in the second state is directly started. In one embodiment, in this embodiment, there is a comparison operation before operation 103, to determine whether the ambient temperature at the air inlet of the charging apparatus that is in the second state has reached a particular range. If yes, the heat dissipation fan of the charging apparatus that is in the second state is directly started, to decrease in a timely manner the ambient temperature at the air inlet of the charging apparatus that is in the second state. If no, analysis is performed in operation 103. For example, when the third threshold is 50° C., and the obtained second temperature of the charging apparatus that is in the second state is 51° C., it can be determined that the ambient temperature at the air inlet of the charging apparatus that is in the second state exceeds the third threshold, and the heat dissipation fan of the charging apparatus that is in the second state is started.

An embodiment of this application further provides a method for calculating the temperature difference between the second temperature and the first temperature, including:

A lowest temperature of the first temperatures is obtained based on a plurality of obtained first temperatures.

It should be understood that when there are a plurality of charging apparatuses that are in the first state, a plurality of first temperatures can be obtained accordingly. A quantity of the plurality of first temperatures is the same as a quantity of the charging apparatuses 32 that are in the first state. In other words, each charging apparatus 32 in the first state corresponds to one first temperature. Based on the first temperatures, in the method in this embodiment, the lowest temperature of the first temperatures is obtained and compared with the second temperature.

The second temperature is compared with the lowest temperature of the plurality of first temperatures, to obtain the temperature difference.

Similarly, the ambient temperature at the air inlet of the charging apparatus that is in the second state is denoted as T0, an ambient temperature at an air inlet of a charging apparatus that is in the first state is denoted as T1, a lowest temperature of the plurality of first temperatures T1s is denoted as T11, and the first threshold is denoted as ΔT1.

The foregoing four charging apparatuses are still used as an example for description. Because there are three charging apparatuses that are in the first state, three T1s can be obtained accordingly. For examples, ambient temperatures T1s at air inlets of the three charging apparatuses that are in the first state are respectively 47° C., 48° C., and 49° C. The lowest temperature T11 obtained through analysis is 47° C.

Based on the three T1s, T0 is compared with T11 of the three T1s that has a lowest value, to obtain the temperature difference T0−T11. For example, the obtained second temperature T0 is 49.5° C. The temperature difference T0−T11 between the second temperature T0 and the lowest temperature T11 is 2.5° C.

In some embodiments, when the first threshold ΔT1 is set to 1° C., it can be learned, by comparing the temperature difference T0−T11 with the first threshold ΔT1, that (T0−T11)>ΔT1. Therefore, it is determined that the ambient temperature at the air inlet of the charging apparatus that is in the second state is excessively high, and the corresponding heat dissipation fan is started, to decrease the ambient temperature at the air inlet of the charging apparatus that is in the second state.

In some other embodiments, when the first threshold ΔT1 is set to 3° C., it can be learned, by comparing the temperature difference T0−T11 with the first threshold ΔT1, that (T0−T11)<ΔT1. Therefore, it is determined that the ambient temperature at the air inlet of the charging apparatus that is in the second state is within the normal range. In this case, the heat dissipation fan of the charging apparatus that is in the second state is not started.

An embodiment of this application further provides another method for calculating the temperature difference between the second temperature and the first temperature. In comparison with the foregoing embodiment, in this embodiment, the second temperature is compared with an average temperature of a plurality of first temperatures. The method includes:

obtaining, based on the plurality of obtained first temperatures, an average temperature of the first temperatures; and comparing the second temperature with the average temperature of the plurality of first temperatures, to obtain the temperature difference.

The average temperature of the plurality of first temperatures T1s is denoted as T12. The foregoing four charging apparatuses are correspondingly used as an example for description. Ambient temperatures T1s at air inlets of the three charging apparatuses that are in the first state are respectively 47° C., 48° C., and 49° C. The average temperature T12 obtained through analysis is 48° C. The obtained second temperature T0 is 49.5° C. Therefore, the temperature difference T0−T12 between the second temperature T0 and the average temperature T12 is 1.5° C.

In some embodiments, when the first threshold ΔT1 is set to 1° C., it can be learned, by comparing the temperature difference T0−T12 with the first threshold ΔT1, that (T0−T12)>ΔT1. Therefore, it is determined that the ambient temperature at the air inlet of the charging apparatus that is in the second state is excessively high, and the corresponding heat dissipation fan is started, to decrease the ambient temperature at the air inlet of the charging apparatus that is in the second state.

In some other embodiments, when the first threshold ΔT1 is set to 3° C., it can be learned, by comparing the temperature difference T0−T12 with the first threshold ΔT1, that (T0−T12)<ΔT1. Therefore, it is determined that the ambient temperature at the air inlet of the charging apparatus that is in the second state is within the normal range. In this case, the heat dissipation fan of the charging apparatus that is in the second state is not started.

When the temperature difference (T0−T11 or T0−T12) is the same as the first threshold ΔT1, correspondingly, the control method in this application provides two types of embodiments. In one type of embodiments, the heat dissipation fan of the charging apparatus that is in the second state is started; and in the other type of embodiments, the heat dissipation fan of the charging apparatus that is in the second state is not started.

Correspondingly, for example, the obtained temperature difference is T0−T11. When the first threshold ΔT1 is set to 2.5° C., it can be learned, by comparing the temperature difference T0−T11 with the first threshold ΔT1, that (T0−T11)=ΔT1. Therefore, it is determined that the ambient temperature at the air inlet of the charging apparatus that is in the second state is within the normal range. In this case, the heat dissipation fan of the charging apparatus that is in the second state is not started.

In some other embodiments, when the first threshold $\Delta T1$ is set to 2.5° C., it can be learned, by comparing the temperature difference T0−T11 with the first threshold $\Delta T1$, that (T0−T11)=$\Delta T1$. Therefore, it is determined that the ambient temperature at the air inlet of the charging apparatus that is in the second state is relatively high and that cooling processing needs to be performed to prevent a potential accident of shutdown caused by an over-temperature. In this case, the heat dissipation fan of the charging apparatus that is in the second state is started.

In some embodiments, the charging pile control method further includes: when the temperature difference is less than or equal to a second threshold, turning off the heat dissipation fan of the charging apparatus that is in the second state.

It should be understood that the second threshold is a lower-limit temperature of the temperature difference. The second threshold is denoted as LT2, and the second threshold LT2 is less than or equal to the first threshold $\Delta T1$. Therefore, after the ambient temperature at the air inlet of the charging apparatus that is in the second state is decreased to a particular degree, it can be determined that the ambient temperature at the air inlet of the charging apparatus that is in the second state is already within the normal range and does not affect charging by the charging pile. Therefore, the heat dissipation fan of the charging apparatus that is in the second state is turned off.

For example, $\Delta T1$=$\Delta T2$=2.5° C. When the temperature difference is greater than 2.5° C., the heat dissipation fan of the charging apparatus that is in the second state is started, to carry off heat accumulated on the charging apparatus and decrease the ambient temperature at the air inlet of the charging apparatus. When the temperature difference is less than 2.5° C., it is determined that the ambient temperature at the air inlet of the charging apparatus that is in the second state is within the normal range. In this case, the heat dissipation fan of the charging apparatus that is in the second state is turned off.

For another example, $\Delta T1$=3° C., and $\Delta T2$=1° C. When the temperature difference is greater than 3° C., the heat dissipation fan of the charging apparatus that is in the second state is started, to carry off heat accumulated on the charging apparatus and decrease the ambient temperature at the air inlet of the charging apparatus. When the temperature difference is decreased to a value less than 1° C., it is determined that the ambient temperature at the air inlet of the charging apparatus that is in the second state is within the normal range. In this case, the heat dissipation fan of the charging apparatus that is in the second state is turned off.

In some embodiments, when there are a plurality of charging apparatuses that are in the second state, each charging apparatus that is in the second state has an ambient temperature at an air inlet. In other words, a plurality of second temperatures corresponding to the plurality of charging apparatuses that are in the second state can be obtained. Similar to the embodiments of the charging piles (10a and 10b), in this embodiment, the plurality of second temperatures are at least two second temperatures. Correspondingly, the plurality of second temperatures include a second temperature with a higher value and a second temperature with a lower value.

For ease of understanding, an example is used for brief description in which there are two charging apparatuses that are in the second state. Two second temperatures can be obtained from the two charging apparatuses that are in the second state. When the two second temperatures are of different values, the two second temperatures include a temperature of a higher value and a temperature of a lower value. For example, the two second temperatures are 49° C. and 51° C. A highest temperature, a lowest temperature, and an average temperature of the two second temperatures are respectively 51° C., 49° C., and 50° C. When the two second temperatures are of a same value, the value of the second temperatures is the highest temperature, the lowest temperature, and the average temperature at the same time. For example, when the two second temperatures are both 50° C., the highest temperature, the lowest temperature, and the average temperature of the two second temperatures are all 50° C.

In this case, in the charging pile control method provided in the embodiments of this application, a highest temperature, a lowest temperature, or an average temperature of the plurality of second temperatures can be obtained; the highest temperature, the lowest temperature, or the average temperature is used as an overall second temperature of the plurality of charging apparatuses that are in the second state; and the overall second temperature is compared with the first temperature to obtain the temperature difference. Therefore, a heat dissipation policy may be configured adaptively according to a use requirement, to decrease ambient temperatures at air inlets of the plurality of charging apparatuses 32 that are in the second state.

Based on this, in some embodiments, the highest temperature of the plurality of second temperatures is compared with the lowest temperature of the plurality of first temperatures, to obtain the temperature difference. Alternatively, the highest temperature of the plurality of second temperatures is compared with the average temperature of the plurality of first temperatures, to obtain the temperature difference.

In some other embodiments, the lowest temperature of the plurality of second temperatures is compared with the lowest temperature of the plurality of first temperatures, to obtain the temperature difference. Alternatively, the lowest temperature of the plurality of second temperatures is compared with the average temperature of the plurality of first temperatures, to obtain the temperature difference.

In some other embodiments, the average temperature of the plurality of second temperatures is compared with the lowest temperature of the plurality of first temperatures, to obtain the temperature difference. Alternatively, the average temperature of the plurality of second temperatures is compared with the average temperature of the plurality of first temperatures, to obtain the temperature difference.

In some embodiments, the charging pile control method further includes: when all of the charging apparatuses are operating or none of the charging apparatuses are operating, obtaining internal temperatures of these charging apparatuses; and controlling operation of a heat dissipation fan of an operating charging apparatus based on the internal temperatures and a corresponding first temperature in a preset speed adjustment manner.

Merely embodiments of this application are disclosed above, and this application is not limited thereto. A person skilled in the art can make various modifications and variations to this application without departing from the spirit and scope of this application. It is clear that these modifications and variations shall fall within the protection scope claimed in this application. In addition, although some terms are used in this specification, these terms are merely used for convenience of description and do not constitute any limitation on this application.

What is claimed is:

1. A charging pile control method comprising:
    obtaining a first temperature of a first charging apparatus that is in a first state and that is in a charging pile, wherein the first state is an operating state, the first temperature is an ambient temperature at an air inlet of the first charging apparatus that is in the first state, wherein the charging pile comprises a monitor and a charging assembly comprising a plurality of charging apparatuses including the first charging apparatus and a second charging apparatus, and each charging apparatus is provided with a heat dissipation fan and an ambient temperature sensor;
    obtaining a second temperature of the second charging apparatus that is in a second state and that is in the charging pile, wherein the second state is a sleep state, and the second temperature is an ambient temperature at an air inlet of the second charging apparatus that is in the second state;
    calculating a temperature difference between the second temperature and the first temperature, wherein the monitor is configured to receive and analyze the first temperature and the second temperature;
    determining whether the temperature difference is greater than a first threshold, wherein the first threshold is an upper-limit temperature of the temperature difference; and
    when the temperature difference is greater than the first threshold, starting a heat dissipation fan of the second charging apparatus that is in the second state.

2. The charging pile control method according to claim 1, wherein the method further comprises:
    when the temperature difference is less than or equal to a second threshold, turning off the heat dissipation fan of the second charging apparatus that is in the second state, wherein the second threshold is a lower-limit temperature of the temperature difference, and the second threshold is less than or equal to the first threshold.

3. The charging pile control method according to claim 1, wherein, after the determining whether the temperature difference is greater than the first threshold, the method further comprises:
    when the temperature difference is less than or equal to the first threshold, skipping starting the heat dissipation fan of the second charging apparatus that is in the second state.

4. The charging pile control method according to claim 1 wherein, after the determining whether the temperature difference is greater than the first threshold, the method further comprises:
    when the temperature difference is equal to the first threshold, starting the heat dissipation fan of the second charging apparatus that is in the second state.

5. The charging pile control method according to claim 1, wherein the obtaining the first temperature of the first charging apparatus that is in the first state and that is in the charging pile comprises: obtaining a plurality of first temperatures from a plurality of charging apparatuses that are in the first state, wherein a quantity of the plurality of first temperatures corresponds to a quantity of the charging apparatuses that are in the first state.

6. The charging pile control method according to claim 5, wherein the calculating the temperature difference between the second temperature and the first temperature comprises:
    obtaining, based on the plurality of first temperatures, a lowest temperature or an average temperature of the plurality of first temperatures; and
    comparing the second temperature with the lowest temperature of the plurality of first temperatures, to obtain the temperature difference; or
    comparing the second temperature with the average temperature of the plurality of first temperatures, to obtain the temperature difference.

7. The charging pile control method according to claim 6, wherein, when there are a plurality of second temperatures,
    comparing a highest temperature of the plurality of second temperatures with the lowest temperature of the plurality of first temperatures, to obtain the temperature difference;
    comparing a highest temperature of the plurality of second temperatures with the average temperature of the plurality of first temperatures, to obtain the temperature difference;
    comparing a lowest temperature of the plurality of second temperatures with the lowest temperature of the plurality of first temperatures, to obtain the temperature difference;
    comparing a lowest temperature of the plurality of second temperatures with the comparing a lowest temperature of the plurality of second temperatures with the average temperature of the plurality of first temperatures, to obtain the temperature difference;
    comparing an average temperature of the plurality of second temperatures with the lowest temperature of the plurality of first temperatures, to obtain the temperature difference; or
    comparing an average temperature of the plurality of second temperatures with the comparing an average temperature of the plurality of second temperatures with the average temperature of the plurality of first temperatures, to obtain the temperature difference.

8. The charging pile control method according to claim 1, wherein, before the calculating the temperature difference between the second temperature and the first temperature, the method further comprises:
    determining whether the second temperature exceeds a third threshold, wherein the third threshold is an upper-limit temperature of the second temperature; and
    when the second temperature is greater than the third threshold, directly starting the heat dissipation fan of the charging apparatus that is in the second state; or
    when the second temperature is less than or equal to the third threshold, calculating the temperature difference between the second temperature and the first temperature.

9. A charging pile configured to charge an electric vehicle, wherein the charging pile comprises:
    a monitor; and
    a charging assembly, wherein the charging assembly comprises: two or more charging apparatuses including a first charging apparatus and a second charging apparatus, and each of the charging apparatuses is provided with a heat dissipation fan and an ambient temperature sensor;
    wherein, the charging apparatuses are configured to obtain a corresponding first temperature or second temperature by using the ambient temperature sensors, wherein the first temperature is an ambient temperature at an air inlet of the first charging apparatus that is in a first state, the second temperature is an ambient temperature at an air inlet of the second charging apparatus that is in a second state, the first state is an operating state, and the second state is a sleep state; and the monitor is configured to: receive and analyze the first temperature and the second temperature, and when a temperature difference between the second temperature and the first temperature is greater than a first threshold, start a heat dissipation fan of the second charging apparatus that is in the second state, wherein the first threshold is an upper-limit temperature of the temperature difference.

10. The charging pile according to claim 9, wherein the monitor is further configured to: when the temperature difference is less than or equal to a second threshold, turn off the heat dissipation fan of the second charging apparatus that is in the second state, wherein the second threshold is a lower-limit temperature of the temperature difference, and the second threshold is less than or equal to the first threshold.

11. The charging pile according to claim 9, wherein the monitor is further configured to: when the temperature difference is less than or equal to the first threshold, skip starting the heat dissipation fan of the second charging apparatus that is in the second state.

12. The charging pile according to claim 9, wherein the monitor is further configured to: when the temperature difference is equal to the first threshold, start the heat dissipation fan of the second charging apparatus that is in the second state.

13. The charging pile according to claim 9, wherein the monitor is configured to: receive a plurality of first temperatures from a plurality of charging apparatuses that are in the first state, and obtain a lowest temperature or an average temperature of the plurality of first temperatures, wherein a quantity of the plurality of first temperatures corresponds to a quantity of the charging apparatuses that are in the first state; and the monitor is further configured to: based on the lowest temperature or the average temperature of the plurality of first temperatures, compare the second temperature with the lowest temperature of the plurality of first temperatures, to obtain the temperature difference; or compare the second temperature with the average temperature of the plurality of first temperatures, to obtain the temperature difference.

14. The charging pile according to claim 13, wherein, when there are a plurality of second temperatures, the monitor is further configured to obtain a highest temperature, a lowest temperature, or an average temperature of the plurality of second temperatures; and the monitor is configured to:

compare the highest temperature of the plurality of second temperatures with the lowest temperature of the plurality of first temperatures, to obtain the temperature difference;

compare the highest temperature of the plurality of second temperatures with the compare the highest temperature of the plurality of second temperatures with the average temperature of the plurality of first temperatures, to obtain the temperature difference;

compare the lowest temperature of the plurality of second temperatures with the lowest temperature of the plurality of first temperatures, to obtain the temperature difference;

compare the lowest temperature of the plurality of second temperatures with the compare the lowest temperature of the plurality of second temperatures with the average temperature of the plurality of first temperatures, to obtain the temperature difference;

compare the average temperature of the plurality of second temperatures with the lowest temperature of the plurality of first temperatures, to obtain the temperature difference; or compare the average temperature of the plurality of second temperatures with the average temperature of the plurality of first temperatures, to obtain the temperature difference.

15. The charging pile according to claim 9, wherein the monitor is a component disposed in the charging assembly, and the charging apparatuses of the charging assembly communicate with each other by using the monitor; or the monitor and the charging assembly are independent of each other.

16. The charging pile according to claim 9, wherein the monitor is further configured to:

determine whether the second temperature is greater than a third threshold; and when the second temperature is greater than the third threshold, directly start the heat dissipation fan of the second charging apparatus that is in the second state, wherein the third threshold is an upper-limit temperature of the second temperature.

* * * * *

UNITED STATES PATENT AND TRADEMARK OFFICE
CERTIFICATE OF CORRECTION

PATENT NO. : 11,801,765 B2
APPLICATION NO. : 17/382168
DATED : October 31, 2023
INVENTOR(S) : Gesheng Liu et al.

It is certified that error appears in the above-identified patent and that said Letters Patent is hereby corrected as shown below:

In the Claims

In Claim 7, Column 22, Lines 24-26, delete "comparing a lowest temperature of the plurality of second temperatures with the comparing a lowest temperature of the plurality of second temperatures with the" and insert -- comparing a lowest temperature of the plurality of second temperatures with the --.

In Claim 7, Column 22, Lines 33-35, delete "comparing an average temperature of the plurality of second temperatures with the comparing an average temperature of the plurality of second temperatures with the" and insert -- comparing an average temperature of the plurality of second temperatures with the --.

In Claim 14, Column 24, Lines 9-11, delete "compare the highest temperature of the plurality of second temperatures with the compare the highest temperature of the plurality of second temperatures with the" and insert -- compare the highest temperature of the plurality of second temperatures with the --.

In Claim 14, Column 24, Lines 18-19, delete "compare the lowest temperature of the plurality of second temperatures with the compare the lowest temperature of the plurality of second temperatures with the" and insert -- compare the lowest temperature of the plurality of second temperatures with the --.

Signed and Sealed this
Twenty-third Day of January, 2024

Katherine Kelly Vidal
*Director of the United States Patent and Trademark Office*